(12) United States Patent
Sibalich et al.

(10) Patent No.: US 7,880,394 B2
(45) Date of Patent: Feb. 1, 2011

(54) LIGHTING SYSTEM TO FACILITATE REMOTE MODIFICATION OF A LIGHT FIXTURE MODIFIABLE OPERATING PARAMETER

(75) Inventors: Gregory L. Sibalich, Bowling Green, KY (US); Mark L. Karasak, Lombard, IL (US)

(73) Assignee: HeathCo LLC, Bowling Green, KY (US)

( * ) Notice: Subject to any disclaimer, the term of this patent is extended or adjusted under 35 U.S.C. 154(b) by 432 days.

(21) Appl. No.: 12/104,823

(22) Filed: Apr. 17, 2008

(65) Prior Publication Data

US 2009/0261735 A1   Oct. 22, 2009

(51) Int. Cl.
*H05B 37/00* (2006.01)
(52) U.S. Cl. .................... 315/149; 315/158; 315/159
(58) Field of Classification Search ............. 315/149, 315/156, 157, 158, 159
See application file for complete search history.

(56) References Cited

U.S. PATENT DOCUMENTS 5,451,843 A * 9/1995 Kahn et al. .............. 315/186
6,188,177 B1 * 2/2001 Adamson et al. ........ 315/149

* cited by examiner

*Primary Examiner*—David Hung Vu
(74) *Attorney, Agent, or Firm*—Fitch Even Tabin & Flannery

(57) ABSTRACT

A lighting system comprises a light fixture (100) and a corresponding remote control transmitter (200). The light fixture can comprise at least one electrically energizable light source (102), at least one local condition sensor (103), a receiver (105), a memory (104), and a controller (101). The controller automatically controls energization of the light source as a function of input from the location condition sensor(s) and at least one stored modifiable operating parameter. The controller also automatically modifies the modifiable operating parameter(s) in response to instructions (106) as are received via the receiver. The wireless remote control transmitter (200) comprises a transmitter (202), an end user interface (203), and a controller (201). The controller processes inputs from an end user (as entered via the end user interface) regarding at least one of the aforementioned manipulable operating parameters and transmits this information to the aforementioned light fixture.

24 Claims, 2 Drawing Sheets

US 7,880,394 B2

LIGHTING SYSTEM TO FACILITATE REMOTE MODIFICATION OF A LIGHT FIXTURE MODIFIABLE OPERATING PARAMETER

TECHNICAL FIELD

This invention relates generally to light systems and more particularly to lighting systems that make use of one or more modifiable operating parameters.

BACKGROUND

Lighting systems of various kinds are known in the art. Many such systems typically comprise a light fixture that includes at least one electrically energizable light source. In many cases, the light fixture operates without a need for any modifiable operating parameters; the electrically energizable light source is simply switched on or off in response to an end user's manipulation of a corresponding switch. In other cases, however, the light fixture makes use of one or more modifiable operating parameters to inform its operational behavior.

For example, some light fixtures include an ambient light sensor to facilitate automatic control of the energization status of the light source. In such a case, the light fixture may also employ a modifiable operating parameter to control how long the light source remains energized in response to such stimulus. As another example, some light fixtures include an animate object sensor to facilitate automatic control of the energization status of the light in response to detection of an animate object within the vicinity of the light fixture. In such a case, the light fixture may also employ a modifiable operating parameter to control, for example, the sensitivity of the system to such stimulus.

A light fixture that employs one or more modifiable operating parameters typically provides an integral end user interface to permit an end user to modify the operating parameter as desired. This end user interface typically comprises one or more buttons, switches, potentiometers, sliders, touch screen display, or the like. Unfortunately, this operational paradigm does not necessarily meet the needs of all application settings. In some cases, for example, such a light fixture is mounted relatively high and out of ordinary reach (such as under the eaves of a multistory building). In such a case, it can be inconvenient, at the least, for an end user to effect changes to the modifiable operating parameters of the light fixture. As many end users desire to make at least seasonal adjustments with respect to such modifiable operating parameters, such impediments are highly undesired.

BRIEF DESCRIPTION OF THE DRAWINGS

The above needs are at least partially met through provision of the lighting system to facilitate remote modification of a light fixture modifiable operating parameter described in the following detailed description, particularly when studied in conjunction with the drawings, wherein.

Figure 1:
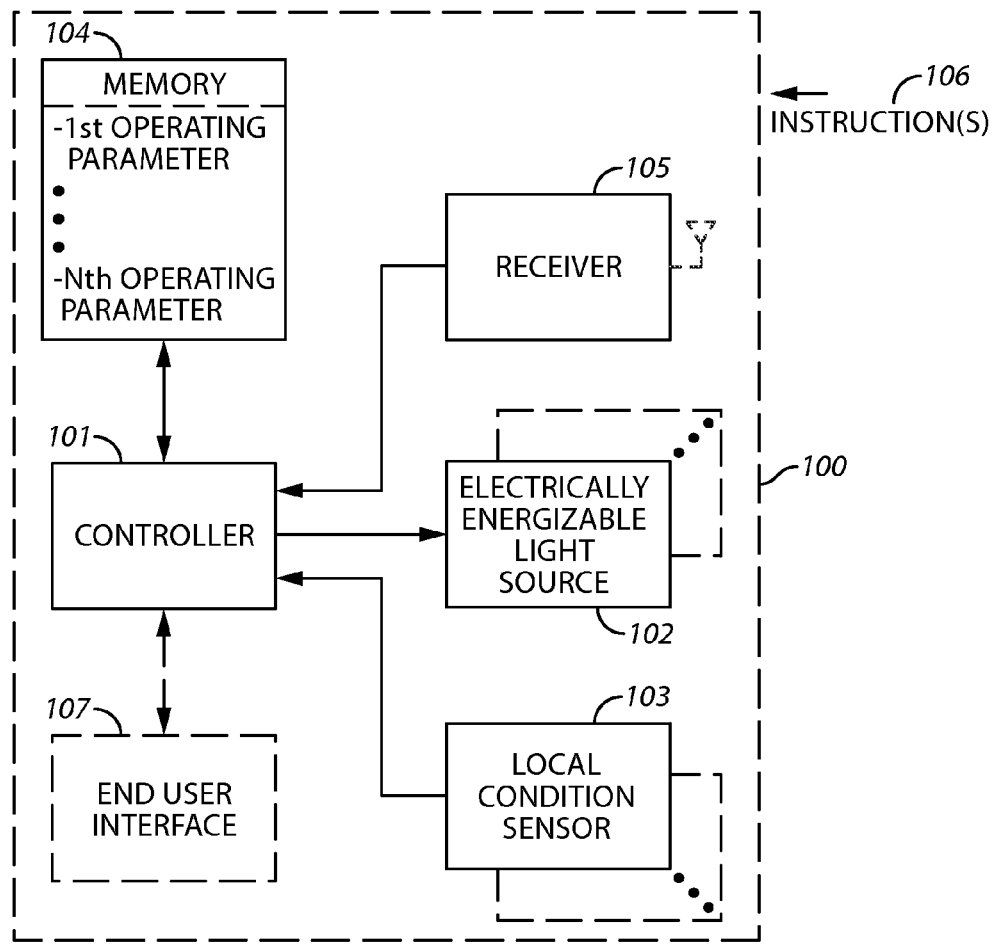
FIG. 1 comprises a block diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a lighting system can comprise a light fixture and a corresponding remote control transmitter. The light fixture can comprise at least one electrically energizable light source, at least one local condition sensor, a receiver, a memory, and a controller that operably couples to the foregoing components. The controller is configured and arranged to automatically control energization of the light source as a function of input from the location condition sensor(s) and at least one modifiable operating parameter as is stored in the memory. The controller is also configured and arranged to automatically modify the aforementioned modifiable operating parameter in response to instructions as are received via the receiver. The remote control transmitter, in turn, can comprise a transmitter, an end user interface, and a controller that operably couples to these aforementioned components. The controller is configured and arranged to process inputs from an end user (as entered via the end user interface) regarding at least one of the aforementioned manipulable operating parameters and to transmit this information to the aforementioned light fixture.

So configured, this lighting system permits an end user to make selective adjustments to one or more manipulable operating parameters as govern the automatic dynamic functionality of the light fixture without being required to directly physically engage and interact with the light fixture. This, in turn, permits the end user to make such changes without needing to climb a ladder, lean out a window, reach down from roof, or engage in other inconvenient activities. Those skilled in the art will recognize and appreciate that these teachings are readily employable with numerous existing platforms and components. It will also be noted that these teachings are readily scalable and will accommodate a wide range of modifiable operating parameters and/or light fixtures.

These and other benefits may become clearer upon making a thorough review and study of the following detailed description. Referring now to the drawings, and beginning with FIG. 1, various illustrative embodiments that are compatible with many of these teachings will now be presented.

In this illustrative example, a light fixture 100 comprises a controller 101 that operably couples to a number of other components including one or more electrically energizable light sources 102. Those skilled in the art will recognize and appreciate that such a controller 101 can comprise a fixed-purpose hard-wired platform or can comprise a partially or wholly programmable platform (such as, but not limited to, a microprocessor or a microcontroller). These architectural options are well known and understood in the art and require no further description here. The electrically energizable light source(s) 102 can comprise essentially any known (or hereafter developed) electrically energized lighting technology. Examples in this regard include, but are not limited to, replaceable lighting elements such as incandescent or fluorescent bulbs as well as permanently installed lighting elements such as light emitting diodes (LEDs). When designed to accommodate replaceable lighting elements, the electrically energizable light source 102 can comprise one or more sockets that are designed and configured to receive, accommodate, and compatibly interact with a corresponding bulb base design. Numerous examples in these regards are also well known in the art and again require no further elaboration here.

As noted above, this controller 101 also operably couples to other components in addition to the electrically energizable light source 102. These can include, but are not limited to, a local condition sensor 103, a memory 104, and a receiver 105. There are various local condition sensors that are known in the art that can be readily employed in such an application setting and others are likely to be developed going forward. By one approach, for example, one such local condition sensor 102 can comprise an ambient light sensor. Such a sensor is typically designed and deployed in order to sense, for example, ambient light conditions such as the onset of dusk and/or the arrival of dawn. By another approach, this local condition sensor 102 can comprise an animate object sensor. The animate object at issue is often a human being though other moving objects, such as feral animals or automobiles, may be worthy and desired detection targets as well. Again, various animate object sensors are known in the art with examples including, but not being limited to, passive infrared (PIR) sensors, ultrasonic-based sensors, radar-based sensors, laser-based sensors, and so forth.

So configured, the controller 101 can be configured and arranged (via, for example, corresponding programming as will be well understood by those skilled in the art) to automatically control energization of the at least one electrically energizable light source as a function of input(s) from the one or more local condition sensor(s) 103. As one typical example in this regard, the controller 101 can be figured to cause the light source 102 to become illuminated (perhaps at a first lower-level of intensity) at the onset of dusk and to also become illuminated (perhaps at a second higher-level of intensity) upon detecting the presence of a human being in the vicinity of the light fixture.

The aforementioned memory 104 can serve to store one or more modifiable operating parameters. The controller 101, in turn, can be configured and arranged to effect the aforementioned automatic control of the electrically energizable light source 102 as a function not only of inputs from the local condition sensor(s) 103 but also of at least one of these stored modifiable operating parameters as is stored in the memory 104.

As used herein, the expression "modifiable operating parameter" will be understood to refer to a value by which the automatic operation of the controller 101 (and hence the automatic energization and de-energization of the light source 102) is influenced and controlled. It will be understood that this expression does not include simple binary states of the light such as "turning the light on" and "turning the light off." Instead, this expression is directed to a wider range of operational functionality. Examples include, but are not limited to:

a sensitivity level as corresponds to an animate object sensor;

a sensitivity level as corresponds to an ambient light sensor; and/or a temporal operating parameter (such as a duration of time to maintain the at least one electrically energizable light source 102 to become automatically energized in response to detecting a particular level of ambient light, a duration of time to maintain the at least one electrically energizable light source 102 in an energized state when causing the at least one electrically energizable light source 102 to become automatically energized in response to detecting an animate object, and so forth).

So configured, the controller 101 can obtain from the memory 104 a given operating parameter as may be useful or required when effecting a particular action, step, or function. Those skilled in the art will recognize and understand that such an apparatus 100 may be comprised of a plurality of physically distinct elements as is suggested by the illustration shown in FIG. 1. It is also possible, however, to view this illustration as comprising a logical view, in which case one or more of these elements can be enabled and realized via a shared platform. As but one example in this regard, the aforementioned memory 104 can comprise an integral part of the controller 101 if desired.

As noted above, the operating parameters stored in the memory 104 are modifiable. As used herein, this reference to "modifiable" will be understood to refer to a parameter that is intended and designed to be changed by an end user in the ordinary course of using the light fixture 100. Accordingly, a parameter will not be considered "modifiable" merely because a trained technician, armed with knowledge and equipment not readily available to or provided to the ordinary end user, might be able to force a change by, for example, directly overwriting the memory location where the parameter is stored.

Also as noted above, the controller 101 also operably couples to a receiver 105. This receiver 105 serves to receive instructions 106 that pertain to automatically modifying one or more of the modifiable operating parameters. There are numerous enabling technologies that might be considered useful in this regard. By one optional approach, for example, this receiver 105 can comprise a wireless receiver. Depending upon the application setting, a Bluetooth receiver may be adequate. For many purposes, however, this receiver, when wireless, may be configured and arranged to make use of the so-called wireless microphone spectrum. These are other technologies are well known in the art. For example, by one approach, this receiver can comprise a wired receiver such as Power Line Communication (PLC)-based receiver as is known in the art. As these teachings are not overly sensitive to any particular selection in this regard, for the sake of brevity and the preservation of clarity, further elaboration in this regard will not be presented here.

So configured, the controller 101 can be further configured and arranged to automatically modify one or more of the stored modifiable operating parameters in response to instructions 106 as are received via the receiver 105. Such instructions 106 can be provided using any of a wide variety of available wireline and/or wireless signaling protocols as desired. This can include using, or not using, such error detection and/or error correction techniques as may be appropriate for use in a given application setting. This can also include using, or not using, encryption techniques to encrypt part or all of the instructions 106. Those skilled in the art will further understand that these instructions 106 can comprise the only payload being received by the receiver 105 or that these instructions 106 can be combined with other messages as desired.

It will also be understood and appreciated that, if desired, the receiver 105 can comprise a part of a transceiver. In such a case, the controller 101 can also be configured and arranged to transmit messages that may, or may not, be related to receipt and/or use of the instructions 106. For example, when employing an acknowledgement-based signaling protocol, the controller 101 (or the transceiver when so configured) can provide acknowledgement messages as expected to indicate successful reception of the instructions 106.

It will also be understood and appreciated that, if desired, the receiver 105 can be embodied by a number of different technologies. Wireless communications, for example, can be provided using either one way or two way communications modalities with examples comprising, but not being limited to, radio frequency-based communications, light-based communications, and sound-based communications.

As noted, these instructions 106 provide a mechanism for permitting an end user to effect modifications to the modifiable operating parameter(s). If desired, the light fixture 100 can also optionally be configured to include an end user interface 107 that operably couples to the controller 101. This end user interface 107 can comprise, for example, a keypad, a voice recognition input, a touch screen, a cursor control mechanism, and so forth as desired. Using this end user interface 107, and via appropriate configuration and arrangement of the controller 101, an end user can select a given modifiable operating parameter and modify that parameter in some desired fashion.

The aforementioned instructions (106) (and/or the modification information provided by an end user via the end user interface 107) can assume a variety of forms. By one approach, for example, the instructions can comprise the actual value to be used for the parameter. For example, when a given modifiable operating parameter can comprise any integer from one to five, a particular corresponding instruction might comprise a given specific integer value (such as, for example, "three") to be used going forward as the value for that parameter. By another approach, the instructions can comprise an instruction regarding relative movement of the parameter value. For example, the instruction can comprise an instruction to increase (or to decrease) the present value (whatever that might be) by a given amount (such as a specified amount or a default value such as "one"). Those skilled in the art will recognize that other possibilities may be useful in this regard as well.

Figure 2:
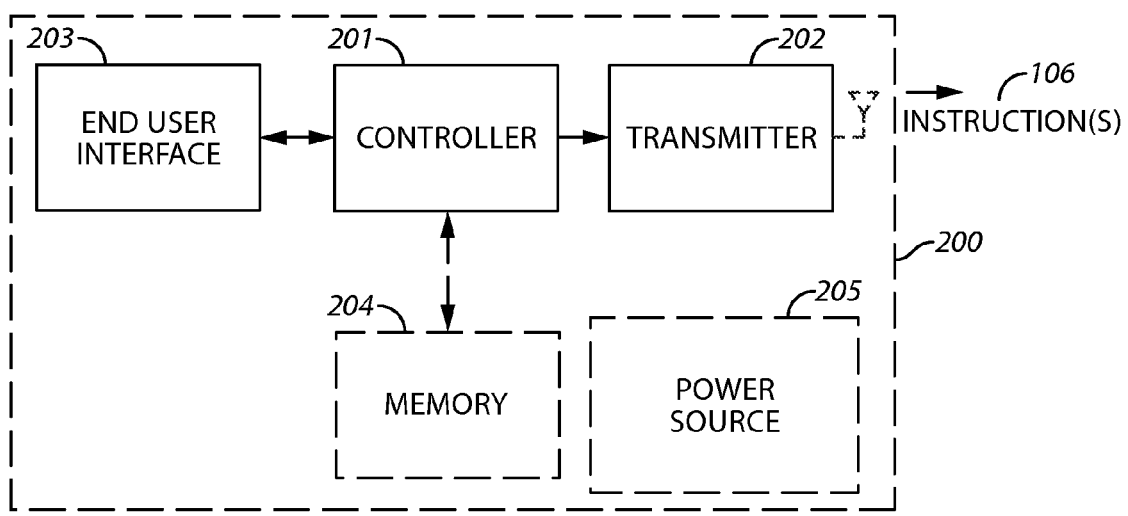
FIG. 2 comprises a block diagram as configured in accordance with various embodiments of the invention.

Referring now to FIG. 2, a remote control transmitter 200 suitable for use with such a light fixture 100 will be described. It will be understood that these embodiments are provided by way of example and that other counterpart components may be used as well to effect these teachings.

The remote control transmitter 200 generally comprises a controller 201 that operably couples to a transmitter 202 and an end user interface 203. The controller 201 may also operably couple, if desired, to a memory 204. This transmitter 202 is configured and arranged to selectively transmit the aforementioned instructions 106 for reception by the light fixture's receiver 105. It will therefore be understood that the transmitter 202 will comprise a platform capable of transmitting a carrier and of using a signaling scheme that will be compatible with the reception capabilities of the receiver 105. When the receiver 105 comprises a wireless receiver, for example, this transmitter 202 can comprise a compatible wireless transmitter. Similarly, when the receiver 105 comprises a Power Line Communication-based receiver, this transmitter 202 can comprise a compatible Power Line Communication-based transmitter.

This remote control transmitter 200 can further comprise, as desired, a power source 205. This power source 205 can couple as appropriate to one or more of the aforementioned components in order to provide enabling electrical power to such components. This power source 205 can comprise any suitable source of electrical power including both direct current (DC) portable sources (such as a battery or batteries) and/or an interface to a source of alternating current (AC) such as a mains electrical supply for a building. (Those skilled in the art will recognize that an interface to AC power may be useful when the remote control transmitter 200 is configured and arranged to be installed on, or temporarily disposed on (for example, by being placed in a wall-mounted cradle) a surface such as a wall proximal to such a source, or when the device is configured to work in conjunction with an AC power extension cord.)

So configured, the controller 201 is configured and arranged (again, for example, via appropriate programming) to process inputs from an end user as are entered via the end user interface 203 regarding at least one modifiable operating parameter as pertains to automatically controlling energization of at least one electrically energizable light source as a function of input from at least one local condition sensor and that operating parameter. This controller 201 is also configured and arranged to cause the transmitter 202 to transmit information regarding the modifiable operating parameter to the light fixture 100 (which of course comprises the electrically energizable light source(s).

If desired, this controller 201 can be provided with a sleep mode to thereby facilitate a conservation of energy. As known in the art, a controller 201 configured in this manner will automatically enter a reduced power mode of operation (hence the moniker "sleep" in the absence of any end user activity. When and as the end user interacts with the end user interface 203 (for example, by pushing a button as described below), the controller 201 then "awakens" and enters a higher power mode of operation that is suitable to support its processing requirements.

By one approach, this apparatus can be configured and arranged to provide for transmission of the aforementioned instructions but to subsequently retain no information regarding that information. This might be appropriate, for example, when the instructions comprise instructions to alter a given modifiable operating parameter in a given relative way (such as by incrementing or decrementing the parameter, whatever its present value, by some given incremental value).

By another approach, this apparatus can be configured and arranged to provide for retention of at least the currently employed or selected modifiable operating parameters. In this case, the operating parameters and/or the characterizing information as is otherwise transmitted to the light fixture 100 can be retained, for example, in the memory 204. If desired, in a somewhat related approach, this memory 204 can comprise a removable memory (such as, for example, a Flashcard memory, an SD memory, a Memory Stick, or the like). This would permit, for example, an end user to quickly deploy a given set of modifiable operating parameters over a large number of lighting systems, using a different remote control transmitter 200 for each such system, without having to re-enter the operating parameter information via the end user interface 203 for each such remote control transmitter 200.

Figure 3:
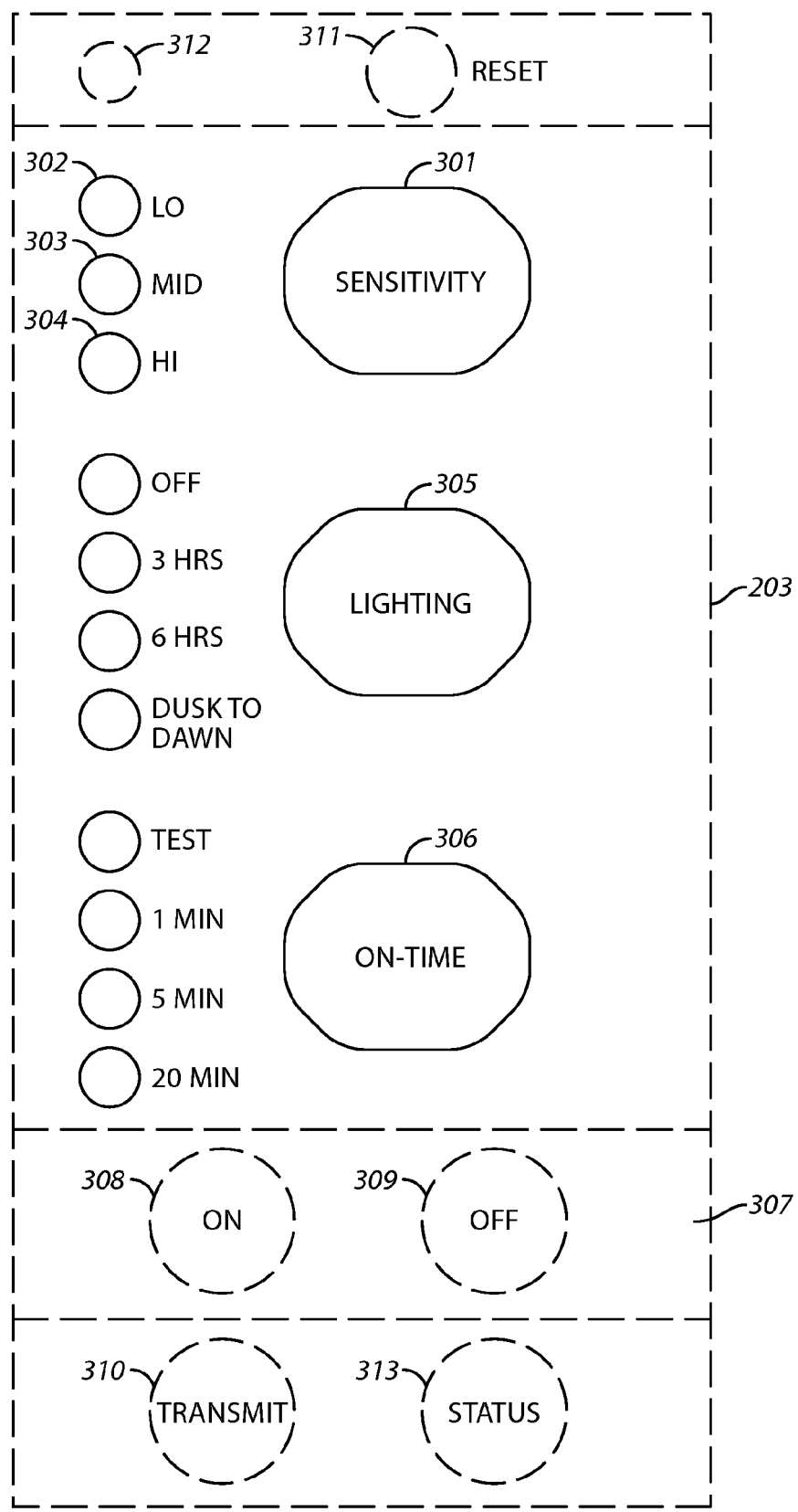
FIG. 3 comprises a schematic representation as configured in accordance with various embodiments of the invention.

The end user interface 203 for the remote control transmitter 200 can assume any of a wide variety of enabling technologies and form factors as will be well understood by those skilled in the art. By way of illustration and with no intention of suggestion any limitations in this regard, and referring now to FIG. 3, a particular grouping of examples in this regard will be provided.

By one approach, the end user interface 203 can comprise a plurality of dedicated buttons that each correspond to a different category of operating parameter. For example, as illustrated, a first button 301 pertains to a sensitivity category of operating parameter (in particular, a sensitivity setting for an inanimate object sensor). Display elements, comprising, in this embodiment, signal lights such as discrete light emitting diodes 302, 303, and 304 can serve to indicate which of three different sensitivity settings have been presently selected via the corresponding sensitivity button 301. By one approach, the sensitivity setting can be changed with each assertion of the button 301. Once an extreme setting has been reached, a next assertion of the button 301 can cause the selection mechanism to roll back to an initial starting point. So, and again by way of example, the sensitivity setting can begin with the "Lo" setting and the signal light 302 as corresponds thereto can be illuminated. By pressing the button 301 once, the setting will switch to the "Mid" setting and the signal light 303 as corresponds to this setting will illuminate while the "Lo" signal light 302 extinguishes. Similarly, by pressing the button 301 again, the setting will switch again to the "Hi" setting, thereby extinguishing the "Mid" signal light 303 and illuminating the "Hi" signal light 304. Pressing the button 301 once again will cause the selection setting to roll back to the "Lo" setting.

In a similar manner, another dedicated button 305 can be provided for a lighting operating parameter (in this case, a duration of time operating parameter following which the corresponding light fixture will be extinguished after having been energized (to either a full power mode of operation or to a lower power mode of operation as desired) in response to detecting a particular level of darkness). And as yet another example in this regard, another dedicated button 306 can be provided for an on-time operating parameter (where, in this case, the on-time refers to an amount of time the light fixture will remain energized (or, for example, reduced from the aforementioned higher level of intensity to a lower level of light intensity) upon sensing an animate object via an animate object sensor).

Other possibilities also exist in this regard, of course. In addition to supporting the selection and transmission of modifiable operating parameters for a given light fixture, such a remote control transmitter 200 can provide for the selection and transmission of operating state selection instructions. As illustrated, for example, the end user interface 203 can provide a portion 307 of the interface that supports a first button 308 which serves as an "On" button and a second button 309 which serves as an "Off" button. These buttons 308 and 309 can serve to permit an end user to alter a present operating state of the light fixture 100 that may be different than its automated behavior would otherwise dictate. For example, the "On" button 308 could serve to cause the light fixture 100 to energize at a time, or under circumstances, when the light fixture 100 would not otherwise be energized. The "Off" button 309 could be employed in a similar fashion to de-energize the light fixture 100 regardless of its automated programming. As another alternative in these regards, these "On" and "Off" buttons 308 and 309 could serve to switch the light fixture 100 between an automatically-implemented dusk to dawn mode of operation and a manually-imposed dusk to dawn mode of operation.

By one approach, this remote control transmitter 200 could transmit an instruction to the light fixture 100 with each selection of a particular modifiable operating parameter setting. By another approach, however, an end user could choose to complete all of their programming selections prior to instigating the transmission of a corresponding instruction message. To facilitate this latter approach, the end user interface 203 can be provided with an optional "Transmit" button 310. In this case, the end user could make their selection, category by category, and defer the transmission of the corresponding instructions until they had completed the making of their selections. To put it another way, this approach permits the batch transmission of a plurality of different operating parameters to the light fixture 100.

In many cases it may be preferred that such changes to the modifiable operating parameters of the light fixture remain as set unless and until the end user should again choose to make a change. In other cases, however, it may be useful to also accommodate changes that are only temporary. For example, when setting the light fixture to provide full illumination from dusk until dawn, it may be useful to automatically reset that parameter to a default condition which provides for using a lower level illumination intensity during the dusk to dawn interval. Such a situation can arise, for example, when an end user is going out for a late evening and wishes for their exterior lighting to provide full brightness illumination as an added enhancement to the security of their facilities but who also wishes for their usual less-bright landscape-style lighting to resume the following evening. To accommodate such situations, if desired, this remote control transmitter 200 can further include the capability of transmitting a corresponding instruction in these regards to the light fixture. By one approach, this capability can be coupled with one of the already mentioned buttons. By another approach, if desired, a button 311 dedicated to this functionality can be optionally provided (along with, if desired, a corresponding signal light 312).

This illustrative example also depicts another option that may be considered. In particular, the end user interface 203 can further comprise a "Status" button 313. So configured, the controller 201 can be configured and arranged to respond to detecting an end user inquiry regarding the status of the device's settings (that is, an inquiry regarding the present settings for one or more of the supported operating parameters) by providing information regarding those present settings. In the present illustrative example, this could comprise, upon detecting the end user's assertion of the "Status" button 313, lighting each of the signal lights as corresponds to the present settings for each of the modifiable operating parameter categories. These signal lights could then be automatically switched off, if desired, some predetermined period of time following the end user's assertion of the "Status" button 313 in order to conserve energy.

Those skilled in the art will recognize and understand that the use of names for the buttons in the description above serve an illustrative purpose and are not intended to comprise an exhaustive listing of potentially useful names or categories. The specific names provided are not, in and of themselves, a critical aspect of these teachings.

So configured, an end user can readily effect the modification of desired modifiable operating parameters for a given light fixture notwithstanding that the light fixture might otherwise be inconveniently located. This, in turn, makes it considerably easier for the end user to effect such modifications as desired and without needing to make special preparations or arrangements in these regards.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. By way of example, such a lighting system could be readily configured and arranged, again via corresponding programming for the respective controllers 101 and 201, to facilitate the automatic modification of at least one modifiable operating parameter in response to instructions that are transmitted by the remote control transmitter 200 by using a learn-by-example mode of operation. To illustrate, an animate object sensor modifiable operating parameter corresponding to sensitivity could be set by having the light fixture 100 automatically adjust its parameter in this regard, upon receiving this instruction, to just detect the end user. This, in turn, would permit the end user to be in the vicinity of an outer boundary of an area to be monitored and to use the remote control transmitter 200 to achieve such a result. As yet another example in these regards, the remote control can be configured as a transceiver. So configured, the remote control can receive messages from the light fixture such as, but not limited to, acknowledgement signals that transmitted remote control instructions have been received at the light fixture. The remote control could then, for example, provide visual or audible signals to the end user that such transmissions were successfully conveyed.

We claim:

1. A lighting system comprising:
   a light fixture comprising:
      at least one electrically energizable light source;
      at least one local condition sensor;
      a receiver;
      a memory;
      a controller that is operably coupled to the at least one electrically energizable light source, the at least one local condition sensor, the memory, and the receiver and that is configured and arranged to:
         automatically control energization of the at least one electrically energizable light source as a function of input from the at least one local condition sensor and at least one modifiable operating parameter as is stored in the memory;
         automatically modify the at least one modifiable operating parameter in response to instructions that are received via the receiver.

2. The lighting system of claim 1 wherein the at least one local condition sensor comprises at least of one:
   an ambient light sensor;
   an animate object sensor.

3. The lighting system of claim 2 wherein the at least one local condition sensor comprises both of the ambient light sensor and the animate object sensor.

4. The lighting system of claim 2 wherein the at least one modifiable operating parameter comprises a sensitivity level as corresponds to the animate object sensor.

5. The lighting system of claim 2 wherein the at least one modifiable operating parameter comprises a level as corresponds to the ambient light sensor.

6. The lighting system of claim 1 wherein the at least one modifiable operating parameter comprises a temporal modifiable operating parameter.

7. The lighting system of claim 6 wherein the temporal modifiable operating parameter comprises at least one of:
   a duration of time to maintain the at least one electrically energizable light source in an energized state when causing the at least one electrically energizable light source to become automatically energized in response to detecting a particular level of ambient light;
   a duration of time to maintain the at least one electrically energizable light source in an energized state when causing the at least one electrically energizable light source to become automatically energized in response to detecting an animate object.

8. The lighting system of claim 1 wherein the controller is further configured and arranged to automatically modify the at least one modifiable operating parameter in response to instructions that are received via the receiver by using a learn-by-example mode of operation.

9. The lighting system of claim 1 further comprising:
   a remote control transmitter that is configured and arranged to selectively transmit the instructions to the receiver in response to end user input.

10. The lighting system of claim 1 wherein the receiver comprises a wired receiver.

11. The lighting system of claim 10 wherein the wired receiver comprises a Power Line Communication-based receiver.

12. A lighting system comprising:
   a remote control transmitter comprising:
      a transmitter;
      an end user interface;
      a controller that is operably coupled to the transmitter and the end user interface and that is configured and arranged to:
         process inputs from an end user as are entered via the end user interface regarding at least one modifiable operating parameter as pertains to automatically controlling energization of at least one electrically energizable light source as a function of input from at least one local condition sensor and the at least one modifiable operating parameter;
         transmit information as corresponds to the at least one modifiable operating parameter to a light fixture that comprises the at least one electrically energizable light source.

13. The lighting system of claim 12 wherein the at least one modifiable operating parameter comprises a sensitivity level as corresponds to an animate object sensor.

14. The lighting system of claim 12 wherein the at least one modifiable operating parameter comprises a level as corresponds to an ambient light sensor.

15. The lighting system of claim 12 wherein the at least one modifiable operating parameter comprises a temporal modifiable operating parameter.

16. The lighting system of 15 wherein the temporal modifiable operating parameter comprises at least one of:
   a duration of time to maintain the at least one electrically energizable light source in an energized state when causing the at least one electrically energizable light source to become automatically energized in response to detecting a particular level of ambient light;
   a duration of time to maintain the at least one electrically energizable light source in an energized state when causing the at least one electrically energizable light source to become automatically energized in response to detecting an animate object.

17. The lighting system of claim 12 wherein the end user interface comprises a plurality of dedicated buttons that each correspond to a different category of modifiable operating parameter.

18. The lighting system of claim 17 wherein the end user interface comprises a display element that provides information to the end user regarding a particular present selection of a setting for each different category of modifiable operating parameter.

19. The lighting system of claim 12 wherein the controller is configured and arranged to transmit information as corresponds to the at least one modifiable operating parameter to a light fixture that comprises the at least one electrically energizable light source by batch transmitting information as corresponds to a plurality of different modifiable operating parameters to the light fixture.

20. The lighting system of claim 12 wherein the controller is further configured and arranged to:
   detect, via the end user interface, an end user inquiry regarding present settings for the at least one modifiable operating parameter;
   provide, via the end user interface and in response to detecting the end user inquiry, information regarding the present settings.

21. The lighting system of claim 12 further comprising:
   a light fixture comprising:
      the least one electrically energizable light source;
      at least one local condition sensor;
      a receiver;
      a memory;
      a controller that is operably coupled to the at least one electrically energizable light source, the at least one local condition sensor, the memory, and the receiver and that is configured and arranged to automatically control energization of the at least one electrically energizable light source as a function of input from the at least one local condition sensor and the at least one modifiable operating parameter as is received from the remote control transmitter via the receiver and as is stored in the memory.

22. The lighting system of claim 12 wherein the transmitter comprises a wired transmitter.

23. The lighting system of claim 22 wherein the wired transmitter comprises a Power Line Communication-based transmitter.

24. The lighting system of claim 12 wherein the transmitter comprises a wireless transmitter.

* * * * *

UNITED STATES PATENT AND TRADEMARK OFFICE
CERTIFICATE OF CORRECTION

| | | |
|---|---|---|
| PATENT NO. | : 7,880,394 B2 | Page 1 of 1 |
| APPLICATION NO. | : 12/104823 | |
| DATED | : February 1, 2011 | |
| INVENTOR(S) | : Gregory L. Sibalich et al. | |

It is certified that error appears in the above-identified patent and that said Letters Patent is hereby corrected as shown below:

TITLE PAGE:

Line (75) Inventors: Change "Karasak" to -- Karasek --.

Signed and Sealed this
Second Day of October, 2012

David J. Kappos
*Director of the United States Patent and Trademark Office*